(12) United States Patent
Arostegui Camacho

(10) Patent No.: US 10,393,617 B2
(45) Date of Patent: Aug. 27, 2019

(54) MEASUREMENT METHOD OF FORCES ON RAILS AND SYSTEM THAT EXECUTES SAID METHOD

(71) Applicant: ANÁLISIS Y SIMULACIÓN, S.L., Miñano (ES)

(72) Inventor: Iker Unai Arostegui Camacho, Vitoria (ES)

(73) Assignee: ANÁLISIS Y SIMULACIÓN, S.L., Miñano (ES)

( * ) Notice: Subject to any disclaimer, the term of this patent is extended or adjusted under 35 U.S.C. 154(b) by 0 days.

(21) Appl. No.: 15/940,000

(22) Filed: Mar. 29, 2018

(65) Prior Publication Data

US 2018/0283980 A1      Oct. 4, 2018

(30) Foreign Application Priority Data

Mar. 31, 2017    (ES) .................................. 201700470

(51) Int. Cl.

| | |
|---|---|
| *G01L 5/16* | (2006.01) |
| *G01M 5/00* | (2006.01) |
| *B61L 23/04* | (2006.01) |
| *B61L 27/00* | (2006.01) |
| *G01L 5/20* | (2006.01) |
| *G01M 17/08* | (2006.01) |

(52) U.S. Cl.
CPC ........... *G01M 5/0025* (2013.01); *B61L 23/04* (2013.01); *B61L 27/0088* (2013.01); *G01L 5/16* (2013.01); *G01L 5/20* (2013.01); *G01M 5/0041* (2013.01); *G01M 17/08* (2013.01); *B61L 23/045* (2013.01)

(58) Field of Classification Search
CPC ................................................... G01M 5/0025
See application file for complete search history.

(56) References Cited

U.S. PATENT DOCUMENTS

| | | | | |
|---|---|---|---|---|
| 8,892,368 B2 * | 11/2014 | Saracho Rotaeche | ... | B61K 9/08 702/113 |
| 2007/0044566 A1 * | 3/2007 | Harrison | ... | B61K 9/08 73/760 |
| 2011/0313686 A1 * | 12/2011 | Saracho Rotaeche | ... | B61K 9/08 702/42 |

FOREIGN PATENT DOCUMENTS

WO     WO 2010100299 A2 *   9/2010   ............... B61K 9/08

* cited by examiner

*Primary Examiner* — Jamel E Williams
(74) *Attorney, Agent, or Firm* — Jenkins, Wilson, Taylor & Hunt, P.A.

(57) ABSTRACT

Provided are methods for measuring forces exerted on rails or such like as a cause of the transit of vehicles on said rails, for determining the values of different parameters, and for calculating coefficients or other variables. Also provided are systems of devices that allow for the taking of values and for the recording, processing, and sampling of the resulting information based on measurement methods that allow directly measuring the lateral force, in a more simplified manner of installation resulting in lower cost in sensors and with greater precision based on the configuration of said sensors and their individual valuation.

10 Claims, 2 Drawing Sheets

MEASUREMENT METHOD OF FORCES ON RAILS AND SYSTEM THAT EXECUTES SAID METHOD

CROSS REFERENCE TO RELATED APPLICATION

This application claims priority to Spanish Patent Application Serial No. P201700470, filed Mar. 31, 2017, the disclosure of which is incorporated herein by reference in its entirety.

TECHNICAL FIELD

The present invention relates to methods for measuring forces exerted on rails or such like as a cause of the transit of vehicles on said rails, to determining the values of different parameters, and to calculating coefficients or other variables. The presently disclosed subject matter also relates to systems of devices that allow for taking values as well as recording, processing, and sampling of the resulting information.

BACKGROUND

Measurement methods of the stresses exerted on rails by the vehicles that travel on them exist and, therefore, they form part of the state of the art. Said methods show the placement of multiple extensometric sensors (strain gauges) in certain configurations to be able to obtain track compression values, and the bending moment.

The use of extensometric sensors allows measuring the elongation of the sensor which, as they are fixed to the rail in a specific position, measure the elongation of said rail. The combinations used in the known methods are performed by combining pairs of extensometric sensors placed on both sides of the track and connected together forming a Wheatstone bridge, or half Wheatstone bridge, to directly measure the forces exerted on the rail.

As indicated, in the known methods various pairs of said strain gauges must be placed connected together to be able to directly obtain the values of the measurements sought in said known configuration, such as, for example, pairs of parallel strain gauges, connected to pairs of strain gauges parallel to the other side of the rail, and pairs of perpendicular strain gauges connected to pairs of strain gauges perpendicular to the other side of the rail.

Said configuration involves the need to use a greater number of extensometric sensors, one or more pairs of strain gauges to have a measurement channel, and the need to join said strain gauges on both sides of the rail having, in most cases, to drill the rail, so that said methods are a considerable cost in devices and a cost in installation time, being multiplied when performing this measurement simultaneously at various points of rail stretches.

The use of Wheatstone bridges to measure lateral forces directly is also known but makes necessary the placement of various pairs of strain gauges connected together, which in said methods are placed on the rail runners feet, something which does not allow taking measurements with sufficient accuracy since the runner foot is much more rigid, with respect to the track web and the electrical signal obtained is foreseeably of worse calibration quality. There is the possibility of indirectly obtaining, via calculation of a finite element method, an approximation of the lateral force, based on known methods that measure bending and compression moments, but as indicated they are indirect approximate methods.

SUMMARY

The measurement method of forces exerted on rails and the system of devices that executes said method of the invention manages to resolve said drawbacks, having other advantages that will be described.

The present invention is based on a novel method of positioning and configuration of extensometric sensors (strain gauges) on a rail or rails whereon one wants to obtain measurement values that make it possible to directly advantageously know the value of the lateral force, and also the direct value of the vertical force, exerted by the vehicles that travel over said rails.

The measurement method is based, as a first step, on the placement of extensometric sensors on the track web, so that two extensometric sensors are placed on each one of the sides of the rail web, thus having in each side an upper sensor and another lower sensor, preferably remaining one as far as possible from the other in the same vertical axis according to the geometry of the rail web and of the sensor, to obtain greater accuracy in measurement of the values. This maximum distance between sensors shall preferably be that corresponding to locating each one within the upper third and lower third respectively of said vertical axis of the rail web, although other separations are possible. The sensors placed on one side and the other of the rail are also located in the same plane, symmetrically to those of the other side.

The sensors are joined to the rails to be able to measure the elongation thereof in the points where said sensors have been placed. To perform this joint preferably welding of the metal substrate of the sensor to the rail is used, achieving convenience and speed of installation, and durability of the installation over time and in robustness, all with respect to the possible alternative rigid joint to the rail, which is the use of adhesives.

Once the sensors have been joined in the indicated positions, they are separately connected to the recording device of the signals obtained from said sensors, having in this way a measurement channel for each one of the four sensors installed in the indicated locations. This novel configuration is based on the fact that, having an individual measurement channel for each sensor, no specific parameter values are obtained, unlike the methods of the state of the art that use the connection between pairs of sensors on one side and the other to have Wheatstone bridges and, in this way, to measure values of a specific force and process together the entire set of pairs of sensors which forms the Wheatstone bridge as a measurement channel.

In this way, the configuration of an independent measurement channel for each sensor does not measure a determined force in particular, such as may be a traction-compression of the track, the bending or the shearing, but that the transit of the vehicle along the rail produces a series of forces in said rail (lateral force, vertical force), which generates a determined elongation of each one of the sensors, which are measured via the analogue voltage signals from each one of said sensors, with these elongations being different for each force produced on the railway track and recording in the recording device associated to its determined position. Once they have the recorded details of the elongation values of each one of the four sensors individually, the method has a calculation system formed by an equation system wherein we can obtain all the desired parameters and, at minimum Q: vertical force, Y: lateral force, with the equations:

$$\Sigma S = Kq * Q$$

$$S1 - S3 = K1 * \Sigma S * X + K2 * Y$$

$$S2 - S4 = K3 * \Sigma S * X + K4 * Y$$

Wherefrom we get the constants:

$$Kq = \Sigma S / Q$$

$$K1 = (S1 - S3)/(\Sigma S * X\text{cal}); \ Y = 0$$

$$K2 = (S1 - S3)/Y; \ Q = 0$$

$$K3 = (S2 - S4)/(\Sigma S * X\text{cal}); \ Y = 0$$

$$K4 = (S2 - S4)/Y; \ Q = 0$$

And thus, finally the solutions:

$$Q = \Sigma S / Kq$$

$$Y = (K1 * (S2 - S4) + K3(S3 - S1))/(K4 * K1 - K2 * K3)$$

With:
- $\Sigma S$—is the sum of the values of the sensors measured in deformation units (strains).
- Q—is the vertical load withstood by the railway track measured in units of force.
- Kq—is the coefficient established by the ratio between the load Q and the term sum of the deformation values measured by the sensors ($\Sigma S$).
- S1, S2, S3, S4—is the deformation value measured by the sensors.
- Y—is the lateral load withstood by the railway track due to the contact between the wheel flange and the track.
- X—distance at which the vertical load Q is located measured from the centre of the railway track. (Used in the calculation of K1 and K3).
- K1, K2 K3, K4—constants obtained by relating applied stresses, application points and measurement of the sensors (obtained by calibration)

In this way, having the sufficient relationship between data and unknowns to be able to propose the previous equation system and resolve it, obtaining:

Each S which is the reading of the elongation which we would have in each sensor, caused by the decentring of the vertical force and by the lateral force. This is evaluated in the cross-section of the rail.

The Ki (K1, K2 K3, K4) are previously obtained by calibration, i.e. they are calculated with a specimen wherein a known vertical force is entered at a known distance "X" from the vertical axis and a known lateral force.

Once the Ki are obtained we now have a system with three equations and three unknowns (Q: vertical force, Y: lateral force, X: distance to the vertical axis)

These calculations are performed in a processing device of the type of computers and its software which, once it has resolved all these unknowns, it can display and/or send, in addition to the results obtained by the processing device, at least one or more related calculations, which need the results obtained from the vertical and lateral forces, such as:

Weighing of the trains travelling at any travelling speed (per wheel and per shaft);

Measurement of the defects in the wheels of the rail vehicles;

Measurement of the travelling speed of the travelling trains

Calculation of the attack angle

Calculation of the Nadal formula (derailment coefficient)

For the execution of the indicated method we have a system of devices formed by four extensometric sensors with individual connection to the recording device (individual measurement channel), where said connection may be physical or wireless, and having processing and display devices of the results by the user, and/or of remote sending of said results to be reviewed in any place which has access to the internet which use the processing, display and/or sending devices.

In this way we have a measurement method, which, through a more simplified installation manner than those known has lower cost in necessary sensor installation, as their necessary number for directly measuring is minimized, which do not have to be connected together, so that it is not necessary to drill the rail, and, therefore, having a much lower assembly cost. Furthermore, it also allows directly measuring the lateral force, and on the rail web, something which makes it possible to obtain a value with greater precision, and therefore it enables obtaining associated calculations that could not be obtained with such precision and with such a reduced cost in the known methods.

BRIEF DESCRIPTION OF THE FIGURES

For a better understanding of the aforementioned, drawings are attached wherein, schematically and only by way of non-limiting example, a practical case of embodiment is represented.

DETAILED DESCRIPTION

Figure 3:
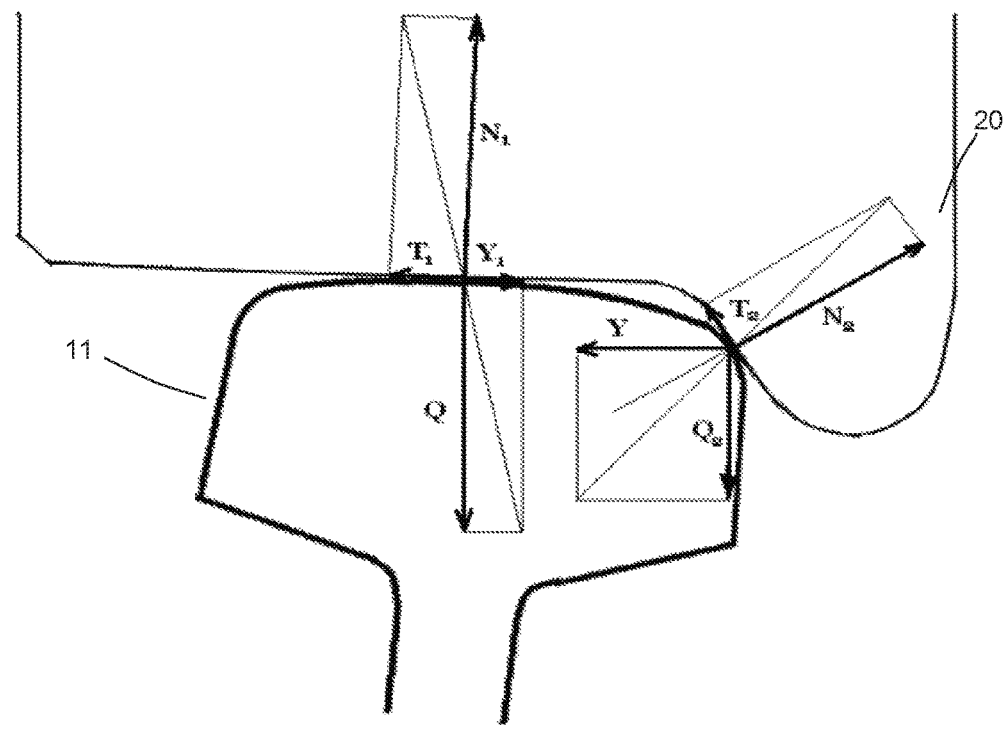
FIG. 3 is a schematic view of the rail with the forces exerted by the wheel of the train thereon.

In the present preferred embodiment of the invention, the measurement method of forces exerted on rails is based on the direct measurement of the lateral force (Y) and vertical force (Q) exerted on a rail (11) by the transit of a vehicle (20) thereon, as shown in FIG. 3, to be able to determine parameters that depend on said measurements such as:

Weighing of the trains travelling at any travelling speed (per wheel and per shaft);

Measurement of the defects in the wheels of the rail vehicles;

Measurement of the travelling speed of the travelling trains

Calculation of the attack angle

Calculation of the Nadal formula (derailment coefficient)

The forces given with respect to said transit of the vehicle on the rail are:

Q—Vertical force

N1—Normal force

T1—Tangential force

Y1—Friction force (reaction to the Tangential)

Q2—Vertical component of the wheel-track contact force

Y—Lateral force (horizontal component of the wheel-track contact force)

N2—Normal force of the wheel-track contact force

T2—Tangential force of the wheel-track contact force

NOTE: The result of the vector sum of N1 and T1 is the opposite (reaction) from the result of the vector sum of Q and Y1. The same with that of sub-index "2".

Figure 1:
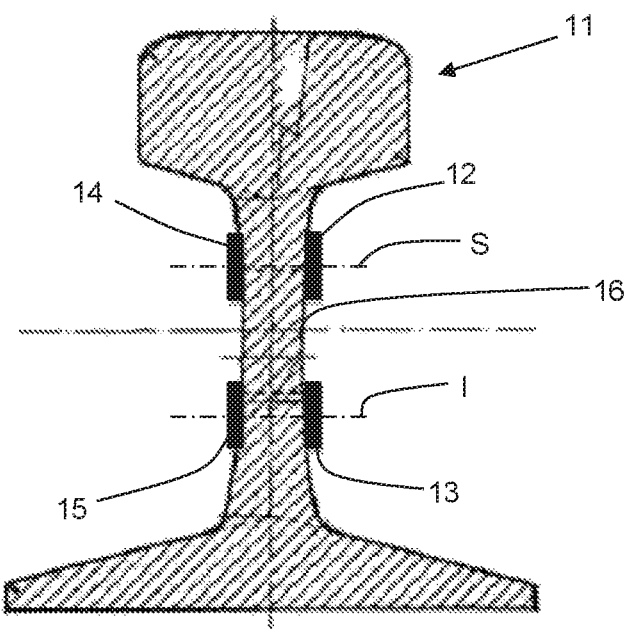
FIG. 1 is a cross-section view of the rail in the position of the extensometric sensors.
Figure 2:
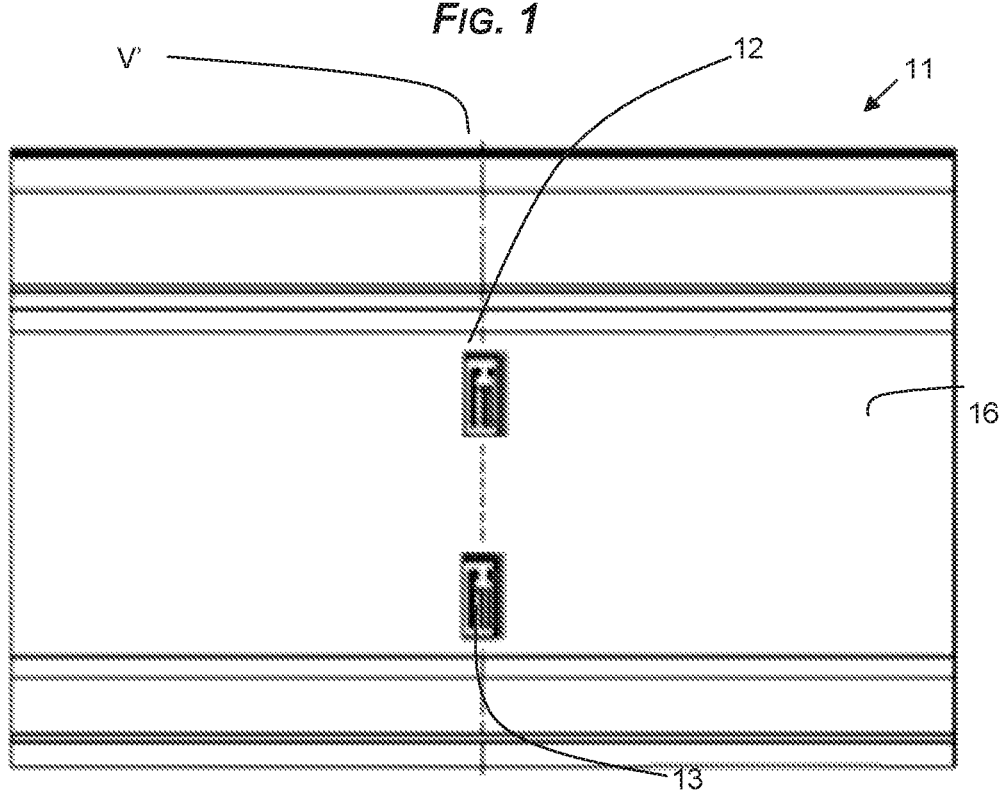
FIG. 2 is a side elevational view of the rail with the extensometric sensors installed.

The measurement method is based, as can be observed in FIGS. 1 and 2, on the solid joint of extensometric sensors (12, 13, 14, 15) to the rail (11). The positioning of the sensors (12, 13, 14, 15) is performed so that on each side of the rail (11), on the web (16), two sensors are positioned, one upper (12, 14) and another lower (13, 15), with each pair of sensors (12-13 and 14-15) located on the same side and within the same vertical axis (V'). The sensors (12, 13, 14, 15) on one side and the other of the rail (11) coincide on the same transversal plane being placed symmetrically one from others. The distance between the two sensors (12-13 and 14-15) of a same side allows greater precision in taking measurements that one wants to take, so that in the present embodiments the upper sensors (12, 14) will be placed within the upper stretch of the web (16) of the rail (11), more specifically in its upper third, and placing the lower sections (13, 15) within the lower stretch of the rail web (16), more specifically in its lower third. Alternatively, other separations are possible between the sensors of a same side (12-13 and 14-15), affecting the precision of the measurement and, therefore, of the calculation, with the maximum possible distance between them being preferable.

The joint of the sensors (12, 13, 14, 15) to the rail (11) is performed via the welding of the metal substrate of said sensors (12, 13, 14, 15) directly to said rail (11), using in this case a point welding, although other methods are possible. Also, and alternatively to the present embodiment, the joint can be performed via the use of adhesive between sensors (12, 13, 14, 15) and rail (11).

Figure 4:
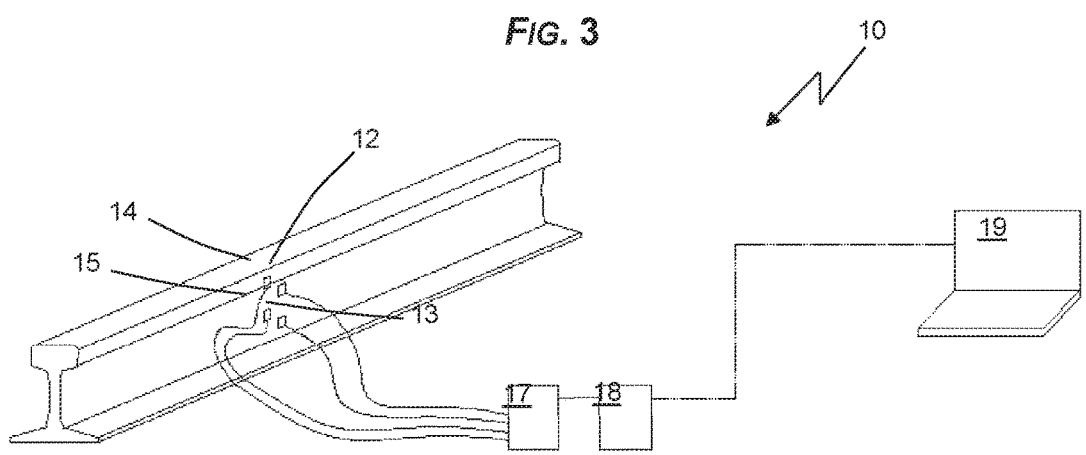
FIG. 4 is a schematic view of the complete system.

As shown in FIG. 4, each one of the sensors (12, 13, 14, 15) are individually connected to a recording apparatus (17), which records the signals of the sensors as the vehicle (20) travels on the rail (11). With this configuration, for each sensor (12, 13, 14, 15) there is an individual measurement channel, without there existing a specific force they measure, but also the elongation signals are obtained of each one (12, 13, 14, 15). In this way, and according to the configuration shown in FIG. 1, there is being measured, in addition to the elongation value provoked in the sensors (12, 13, 14, 15) by the vertical force (Q), the elongation value of the sensors (12, 13, 14, 15) caused by the decentring of the vertical force (Q) and by the lateral force (Y), which makes it possible to calculate the difference in moment in the section (S) that form the upper sensors (12-14) with respect to that of the section (I) of the lower sections (13-15), which is what is definitively calculated in the equation system described in the present invention. The moment that is caused in the sensors by decentring of the vertical force (Q), is the same in both sections, but the moment caused by the lateral force (Y) is different in both sections, so that that difference allows us to calculate the lateral force (Y) produced by the train, without interference of the decentring of the vertical force (Q). For this reason, by measuring in this method the difference between moments of the two indicated sections (S, I), the greater the separation between them the greater the difference in moment and better measurement will be obtained.

Once these measurement values have been obtained, recorded in the recording apparatus (17) whereto the sensors (12, 13, 14, 15) are connected by wiring, although alternatively wireless unit of communication could be used, these values are passed to the processing device (18) which, in the present embodiment are formed by a computer with calculation software, where a calculation system is established with an equation system:

$$\Sigma S = K_q * Q$$

$$S1 - S3 = K1 * \Sigma S * X + K2 * Y$$

$$S2 - S4 = K3 * \Sigma S * X + K4 * Y$$

Wherefrom we get the constants:

$$K_q = \Sigma S / Q$$

$$K1 = (S1 - S3)/(\Sigma S * X\text{cal}); \ Y = 0$$

$$K2 = (S1 - S3)/Y; \ Q = 0$$

$$K3 = (S2 - S4)/(\Sigma S * X\text{cal}); \ Y = 0$$

$$K4 = (S2 - S4)/Y; \ Q = 0$$

And thus, finally the solutions:

$$Q = \Sigma S / K_q$$

$$Y = (K1*(S2 - S4) + K3(S3 - S1))/(K4*K1 - K2*K3)$$

With:
- $\Sigma S$—is the sum of the values of the sensors (12, 13, 14, 15) measured in deformation units (strains).
- Q—is the vertical load withstood by the rail (11) measured in units of force.
- $K_q$—is the coefficient established by the ratio between the load Q and the term sum of the deformation values measured by the sensors ($\Sigma S$) (12, 13, 14, 15).
- S1, S2, S3, S4—is the deformation value measured by the sensors (12, 13, 14, 15).
- Y—is the lateral load withstood by the rail (11) due to the contact between the wheel flange of the vehicle (20) and the rail (11).
- X—distance at which the vertical load Q is located measured from the centre of the rail (11). (Used in the calculation of k1 and k3).
- K1, K2 K3, K4—constants obtained by relating applied stresses, application points and measurement of the sensors (12, 13, 14, 15) (obtained by calibration)

In this way, having the sufficient ratio between data and unknowns to be able to propose the previous equation system and resolve it, obtaining:
- Each S, which is the reading of the elongation which we would have in each sensor (12, 13, 14, 15), caused by the decentring of the vertical force (Q) and by the lateral force (Y). This is evaluated in the cross-section (S, I) of the rail (11).
- The Ki (K1, K2 K3, K4) are previously obtained by calibration, i.e., they are calculated with a specimen wherein is introduced a known vertical force at a known distance "X" from the vertical axis and a known lateral force.
- Once the Ki are obtained we now have a system with three equations and three unknowns (Q: vertical force, Y: lateral force, X: distance to the vertical axis)

These processing device (18), once it has resolved all these unknowns, enables sending the data via telematic network to remote display device (19). In addition to these results of the lateral (Y) and vertical (Q) forces obtained by the processing device (18) following the indicated equation system, and precisely based on them, thanks to the precision they are obtained with in the present invention, the processing device (18) generates related calculations, such as:

Weighing of the trains travelling at any travelling speed (per wheel and per shaft): The value of the weight of the travelling trains coincide with the value of vertical force (Q) calculated via the aforementioned equations Measurement of the defects in the wheels of the rail vehicles Based on the signals obtained in the four sensors (12, 13, 14, 15), a calculation algorithm runs through said signals and determines the existence of small distortions in the signal wave form, with respect to that signal that would be expected if there were no defects in the wheels. This allows detecting the existence of defects and their magnitude. To be able to cover the measurement of the entire wheel perimeter, it may be necessary to place more sensor units every certain interval of distance.

If the system is situated in a curve, calculation of the Nadal formula (derailment coefficient)

The derailment coefficient value is calculated by dividing the value of the horizontal force (Y) by the value of the vertical force (Q).

Derailment coeff.=$Y/Q$

Other parameters can be calculated such as speed of the vehicle (20) or entry angle, but it would be necessary to use another group of sensors.

The measurement system (10) that executes the measurement method is formed, in the present realization, by four extensometric sensors (12, 13, 14, 15) joined to a rail (11), as specified in the method, with individual connection of each sensor (12, 13, 14, 15) to the recording device (17), where said connection in this case is by wiring, and having processing device (18) which wirelessly send by telematic networks, Internet, the results of the calculations performed to display device (19) to be reviewed in any place where there is internet access.

Despite the fact that reference has been made to a specific embodiment of the invention, it is evident for a person skilled in the art that the measurement method of forces exerted on rails and the system of devices that executes it described is susceptible to numerous variations and modifications and that all the details mentioned can be replaced by other technically equivalent ones, without departing from the scope of protection defined by the attached claims.

What is claimed is:

1. A method for measuring directly lateral and vertical forces exerted by a vehicle traveling on a rail, the method comprising:
    measuring the vertical and lateral elongations generated on the rail by the vehicle traveling on the rail via a first and a second pair of extensometric sensors joined to the rail, wherein:
    (i) the first and the second pair of extensometric sensors are present on opposite lateral surfaces of the rail and each comprises a first upper extensometric sensor and a second lower extensometric sensor positioned separately from each other on the same vertical axis;
    (ii) each extensometric sensor is individually connected to a recording device comprising a separate measuring channel for each of the extensometric sensors; and
    (iii) the measuring comprises measuring the vertical elongations provoked in the sensors by the vertical forces and the lateral elongations provoked in the sensors by the decentring of the vertical force and by the lateral force, thereby making it possible to calculate via an equation system the difference in moment in the section that form the upper sensors with respect to that of the section of the lower sections;
    calculating lateral and vertical forces generated by the vehicle on the rail via the lateral and vertical elongations measured by the extensometric sensors using a processor that is in communication with the recording device, wherein the processor employs the following formulas as calculation of at minimum the parameters corresponding to vertical force (Q) and lateral force (Y), the calculation equations being:

$\Sigma S = Kq*Q$ $S1-S3 = K1*\Sigma S*X + K2*Y$ $S2-S4 = K3*\Sigma S*X + K4*Y$; and displaying and/or sending the calculated lateral and vertical forces to a user.

2. The method of claim 1, wherein the two extensometric sensors of each one of the sides of the rail web are installed inside the upper third and lower third respectively, of the vertical stretch of the rail web.

3. The method claim 1, wherein the extensometric sensors are joined to the rail via welding of the metal substrate of the sensor to the rail.

4. The method of claim 1, wherein the extensometric sensors are joined to the rail via a layer of adhesive between the sensor and the rail.

5. The method of claim 1, wherein the processor uses:
    for each S, which is the reading of the elongation which we would have in each sensor, caused by the decentring of the vertical force and by the lateral force, being evaluated in the cross-section of the rail; and
    for the Ki (K1, K2 K3, K4) the values previously obtained by calibration are used.

6. The method of claim 1, wherein the measuring step makes it possible to display and/or send, in addition to the results obtained by the processor, at least one or more related calculations, which need the results obtained from the vertical (Q) and lateral forces (Y), such as:
    Weighing of the trains travelling at any travelling speed (per wheel and per shaft);
    Measurement of the defects in the wheels of the rail vehicles;
    Measurement of the travelling speed of the travelling trains;
    Calculation of the attack angle;
    Calculation of the Nadal formula (derailment coefficient).

7. A system for measuring directly lateral and vertical forces exerted by a vehicle traveling on a rail, the system comprising:
    (i) four extensometric sensors for measuring the vertical elongations provoked in the sensors by the vertical forces and the lateral elongations provoked in the sensors by the decentring of the vertical force and by the lateral force, thereby making it possible to calculate via an equation system the difference in moment in the section that form the upper sensors with respect to that of the section of the lower sections arranged as a first and a second pair, wherein the first and the second pair of extensometric sensors are adapted for placement on opposite lateral surfaces of the rail, each pair comprising a first upper extensometric sensor and a second lower extensometric sensor adapted to be positioned separately from each other on the same vertical axis;

(ii) a recording device comprising a separate measuring channel for each of the extensometric sensors individually connected thereto;

(iii) a processor for calculating lateral and vertical forces generated by the vehicle on the rail via the lateral and vertical elongations measured by the extensometric sensors using a processor that is in communication with the recording device, wherein the processor employs the following formulas as calculation of at minimum the parameters corresponding to vertical force (Q) and lateral force (Y), the calculation equations being:

$$\Sigma S = K_q * Q$$

$$S1 - S3 = K1 * \Sigma S * X + K2 * Y$$

$$S2 - S4 = K3 * \Sigma S * X + K4 * Y;\text{ and}$$

(iv) display and/or sending devices of the results.

8. The system of claim 7, wherein the connection of the sensors to the recording device is physical by wiring.

9. The system of claim 7, wherein the connection of the sensors to the recording device is wireless.

10. The system of claim 7, wherein one or more of the processor, the display, and/or the sending device has a remote connection to the user.

* * * * *